(12) United States Patent
Konolige et al.

(10) Patent No.: US 6,545,702 B1
(45) Date of Patent: Apr. 8, 2003

(54) METHOD AND APPARATUS FOR PANORAMIC IMAGING

(75) Inventors: Kurt Konolige, Menlo Park, CA (US); Steven Derrien, Brest (FR)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 09/390,827

(22) Filed: Sep. 7, 1999

Related U.S. Application Data
(60) Provisional application No. 60/099,504, filed on Sep. 8, 1998.

(51) Int. Cl.$^7$ .................................................. H04N 7/00
(52) U.S. Cl. ........................... 348/36; 358/493; 358/481
(58) Field of Search ............................. 348/36; 358/493, 358/481

(56) References Cited

U.S. PATENT DOCUMENTS

| | | | | |
|---|---|---|---|---|
| 5,920,337 A | * | 7/1999 | Glassman | .................... 348/36 |
| 6,118,474 A | * | 9/2000 | Nayar | ........................ 348/36 |
| 6,226,035 B1 | * | 5/2001 | Korein | ........................ 348/335 |

* cited by examiner

Primary Examiner—Chris Kelley
Assistant Examiner—Charles Parsons
(74) Attorney, Agent, or Firm—Beyer Weaver & Thomas LLP

(57) ABSTRACT

Methods and apparatus for mapping images obtained using a multiple-viewpoint imaging system are disclosed. According to one aspect of the present invention, a method for projecting an image using a panoramic imaging device which includes a first camera includes selecting a single viewpoint that is near a plurality of virtual viewpoints associated with the device. Once the single viewpoint is selected, an optical ray which intersects a surface of the device at a first angle is selected from the plurality of optical rays. The optical ray is then moved or otherwise displaced so that it intersects the single viewpoint while substantially maintaining the first angle. Once the optical ray is displaced, an image is formed using the displaced optical ray to create a reprojection from the single viewpoint. In one embodiment, the panoramic imaging device includes a spherical mirror, and the first camera includes a perspective lens. By reprojecting an image from a single viewpoint, the distortion associated with a multiple-viewpoint system may be reduced.

21 Claims, 6 Drawing Sheets

METHOD AND APPARATUS FOR PANORAMIC IMAGING

This application claims the benefit of Provisional Application Ser. No. 60/099,504 filed Sep. 8, 1998.

This invention was made with Government support under contract No. N00014–97–C–0146 awarded by the Department of Navy, Office the Naval Research. The Government has certain rights in this invention.

BACKGROUND OF THE INVENTION

1. Field of Invention

The present invention relates generally to imaging systems. More particularly, the present invention relates to constructing an approximation of an image obtained using a single-viewpoint imaging system when the image is actually obtained through the use of a non-single-viewpoint imaging system.

2. Description of the Related Art

Panoramic imaging is often used in imaging applications due to the fact that panoramic imaging systems provide a relatively wide field of view. Although panoramic imaging systems may be used for a variety of different purposes, such systems are generally used in applications which benefit from a wide field of view. Such applications often relate to, but are not limited to, the areas of surveillance, robotics, and machine vision.

In general, panoramic imaging systems include devices which are capable of imaging a wide angle of a scene. The wide angle may be up to approximately 360 degrees as measured as both an azimuth and an elevation. Often, panoramic imaging systems require the use of multiple cameras in order to capture a wide angle of a scene. FIG. 1a is a diagrammatic representation of a panoramic imaging system which uses multiple cameras. Cameras 130 are spaced apart, e.g., camera 130a is spaced apart from camera 130b, such that each camera 130 may effectively capture a portion of a scene 140, which may or may not be reflected off of a mirrored surface.

The use of a multiple camera panoramic imaging system 120 typically enables an image of an entire scene 140 to be captured simultaneously. However, using the approximation that each camera 130 is effectively a pinhole camera, each camera 130 has a different viewpoint. Hence, multiple camera panoramic imaging system 120 is a multiple-viewpoint system. A multiple-viewpoint system, or a system which is not a single-viewpoint system, requires a reconstruction in order to create a single image from the data that is gathered using cameras 130. In other words, data gathered from cameras 130 must be reduced in order to form a single, composite image. Such a reconstruction often results in distortions in the reconstructed image, which is arranged to be projected onto a projection surface for viewing. That is, reconstruction errors are likely to occur. Further, the use of a multiple camera panoramic imaging system may be expensive, and requires a significant amount of physical space, as such a system requires multiple cameras 130.

Another example of a panoramic imaging system is shown in FIG. 1b. As shown, a camera 102 is positioned over a curved mirrored surface 104. Camera 102 is positioned such that it images scenes from mirrored surface 104. By imaging scenes from a mirrored surface, a relatively small field-of-view camera may be used to encompass a much larger field of view. Camera 102 may either be a standard camera, which has a perspective lens, or a specialized camera, which has a telecentric lens. The choice of camera 102 is dependent at least in part upon the curvature of mirrored surface 104. By way of example, when mirrored surface 104 has the curvature of a paraboloid, camera 102 is typically a camera with a telecentric lens. Alternatively, when mirrored surface 104 has the curvature of a hyperbola, camera 102 generally includes a perspective lens.

Mirrored surface 104 may generally be flat, spherically curved, paraboloidally curved, or hyperboloidally curved. While mirrored surfaces which are spherically curved are relatively easy to form, a panoramic imaging system with a spherically curved mirrored surface is a multiple-viewpoint system. On the other hand, while panoramic imaging systems with paraboloidally or hyperboloidally shaped mirrored surfaces are typically characterized by single-viewpoints, such mirrored surfaces are difficult to form. Although mirrors curved as paraboloids and hyperboloids are relatively difficult to manufacture and, hence, expensive, panoramic imaging systems which use such mirrors are single-viewpoint systems. As such, reconstruction of a resultant image, obtained using a single-viewpoint system, that is suitable for projection does not result in a significant distortion.

In a multiple-viewpoint system, optical rays do not converge at a single viewpoint associated with, e.g., within, mirrored surface 104. That is, rays that contact mirrored surface 104 at different elevation angles, i.e., angles at which incoming rays contact mirrored surface 104, do not converge at a single viewpoint within mirrored surface 104. Conversely, for single-viewpoint systems, optical rays which are at any elevation angle all converge to a single viewpoint.

As mentioned above, panoramic imaging systems, such as those which utilize mirror imagery, e.g., camera systems, are used for many different purposes. In some cases, the size of an imaging system is not critical. However, in other cases, the need for a compact imaging system is considered to be important. By way of example, for surveillance purposes and for surgical purposes, compact imaging systems are preferred. For surveillance, a compact imaging system is preferred at least in part to prevent an individual who is being monitored from becoming aware of the fact that an imaging system is recording his or her actions. For surgery such as arthroscopic surgery, a compact imaging system is desired in order to enable the imaging system to be used in small spaces.

In general, minimizing the amount of distortion in a reconstructed image is desirable. That is, the ability to accurately reconstruct images is desirable. For delicate applications such as surgical applications, minimizing the amount of distortion associated with a reconstructed image often proves to be critical. By way of example, when a viewed, reconstructed image is inaccurate, or otherwise has a high level of distortion, a surgeon who is relying on the reconstructed image may make errors in a surgical procedure.

Therefore, what is needed is a relatively inexpensive, compact, accurate panoramic imaging system. More specifically, what is desired is a method for reducing the distortion error associated with reconstructing an image which is obtained using a multiple-viewpoint panoramic imaging system.

SUMMARY OF THE INVENTION

The present invention relates to a method and an apparatus for reconstructing images obtained using a multiple-viewpoint imaging system. According to one aspect of the present invention, a method for projecting an image using a panoramic imaging device which includes a first camera includes selecting a single viewpoint that is near a plurality of virtual viewpoints associated with the device. Once the single viewpoint is selected, an optical ray which intersects a surface of the device at a first angle is selected from the plurality of optical rays. The optical ray is then moved or otherwise displaced so that it intersects the single viewpoint while substantially maintaining the first angle. Once the optical ray is displaced, an image is formed using the displaced optical ray to create a reprojection from the single viewpoint. In one embodiment, the panoramic imaging device includes a spherical mirror, and the first camera includes a perspective lens. In such an embodiment, the surface the optical ray intersects is an outer surface of the spherical mirror. By reprojecting an image from a single viewpoint, the distortion associated with a multiple-viewpoint system may be reduced.

According to another aspect of the present invention, an apparatus for imaging a wide field of view includes a camera and a mirrored surface. The camera and the mirrored surface are arranged such that optical rays which intersect the mirrored surface at different angles do not share a single viewpoint. The apparatus also includes a processing system that displaces optical rays to enable the optical rays to intersect the single viewpoint while substantially maintaining the different angles. The processing system also aids in the formation of an image using the displaced optical rays, and reprojects the formed image.

In one embodiment, the processing system is arranged to identify the single viewpoint. In another embodiment, the apparatus also includes a projection surface onto which a formed image may be reprojected. Although the shape of the surface may vary, in such an embodiment, the surface may be either a cylindrically shaped surface or a planar surface.

In accordance with still another aspect of the present invention, a method for mapping an image using a panoramic imaging device that has multiple virtual viewpoints, and includes both a camera and a mirror, involves selecting a single viewpoint. The single viewpoint may be selected to be in proximity to the multiple virtual viewpoints. After the single viewpoint is selected, an incoming optical ray is moved to intersect the single viewpoint such that its elevation angle is maintained. The moved optical ray is than used in the formation of an image. In one embodiment, moving the optical ray includes applying a mathematical algorithm to computationally displace the optical ray.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE EMBODIMENTS

Panoramic imaging systems are used in various applications including, but not limited to, surveillance applications. In order to reduce the amount of distortion in a reprojected image created from a panoramic imaging system, many systems use cameras with telecentric lenses, which are costly. Many systems also use paraboloidally or hyperboloidally shaped mirrors, which are difficult to manufacture and relatively expensive, to allow optical rays to converge at a single viewpoint, thereby reducing the amount of distortion in an image once the image is reconstructed. Although spherically shaped mirrors are easier to manufacture and less expensive than paraboloidally or hyperboloidally shaped mirrors, a panoramic imaging system with a spherically shaped mirror is not a single-viewpoint system. Instead, a panoramic imaging system with a spherically shaped mirror is a multiple-viewpoint system, i.e., has more than one virtual viewpoint.

By mathematically creating a single viewpoint for a multiple-viewpoint panoramic imaging system, a panospheric imaging system, e.g., a panoramic imaging system with a spherically shaped mirrored surface and a camera with a perspective lens, may effectively become a single-viewpoint panoramic imaging system. More generally, multiple-viewpoint panoramic imaging systems may function substantially as single-viewpoint panoramic imaging systems.

A panospheric imaging system is typically characterized by a wide field of view. By way of example, the field of view may be up to approximately 360 degrees horizontally and up to approximately 180 degrees vertically. In a panospheric imaging system, a standard camera, such as a video camera, with a perspective lens images a spherically shaped mirror that has a reflective surface on the outside, which reflects a wide-angle view of a scene. Optical, e.g., light, rays reflect off of the mirror and through the camera lens.

Figure 1:
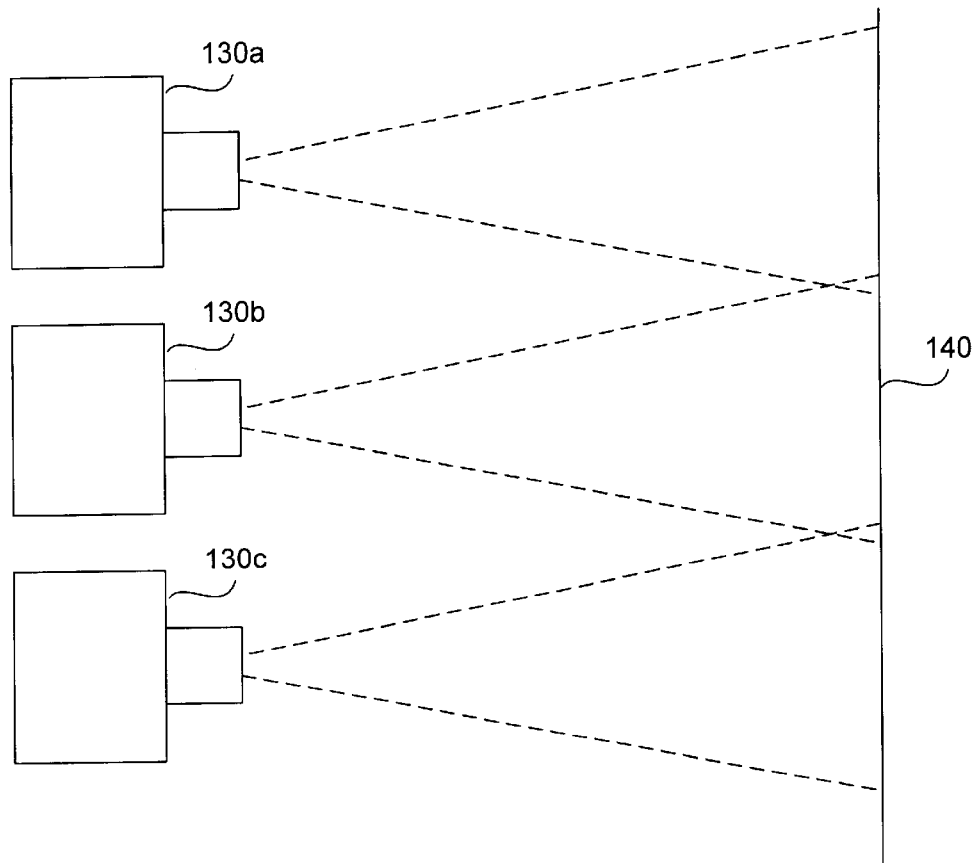
FIG. 1a is a diagrammatic representation of a first panoramic imaging device
FIG. 1b is a diagrammatic representation of a second panoramic imaging device.
Figure 1B:
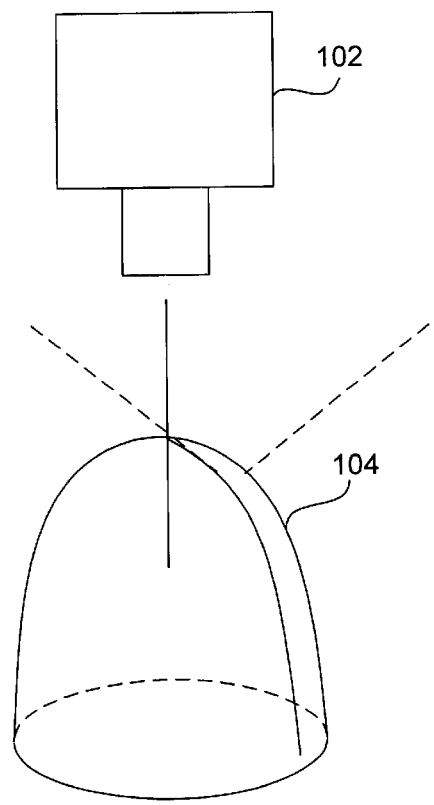
Figure 2:
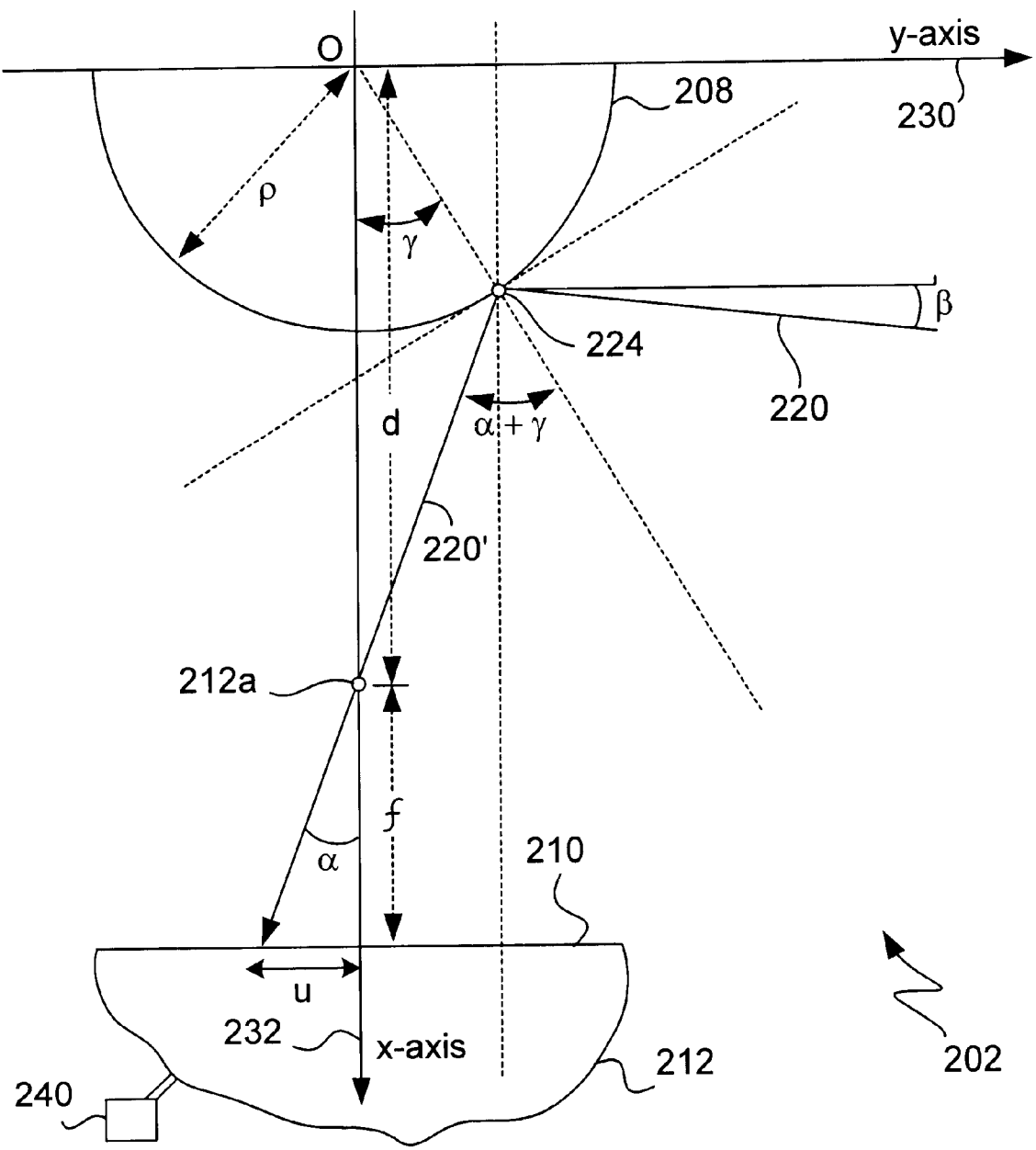
FIG. 2 is a diagrammatic cross-sectional representation of a panospheric imaging device with a spherical mirror and a standard camera in accordance with an embodiment of the present invention.

FIG. 2 is a diagrammatic cross-sectional representation of a panospheric imaging device with a spherical mirror and a camera with a perspective lens in accordance with an embodiment of the present invention. A panospheric imaging device 202 includes a spherical mirror 208, an image plane 210, and an approximation of a camera viewpoint 212a. Panospheric imaging device 202 may also include, in one embodiment, a computing device 240 which is arranged to communicate with a camera 212 to form an image, as will be understood by those skilled in the art.

Camera viewpoint 212a, which may be approximated as a pinhole opening, and image plane 210, are associated with camera 212. Herein and after, optical rays discussed are arranged to substantially pass through camera viewpoint 212a. Viewpoint 212a is separated from image plane 210 by a distance "f", which is equivalent to the focal length of camera 212. In other words, viewpoint 212a is the focal point of the lens of camera 212.

As will be appreciated by those skilled in the art, mirror 208, as well as overall device 202, exhibits radial symmetry. Further, camera 212 and mirror 208 are aligned to share an x-axis 232, which is both a central axis of mirror 208 and an optic axis of camera 212. In general, camera 212 may view a portion of mirror 208 that is less than a hemisphere of mirror 208. The amount of mirror 208 which may be viewed by camera 212 is dependent upon factors which include, but are not limited to, the distance "d" between viewpoint 212b, which is approximately at the center of the lens (not shown) of camera 212, and the center "O" of mirror 208.

An optical ray 220 from an object in a scene contacts the surface of mirror 208 at an intercept point 224. Ideally, reflected ray 220', which is a reflection of ray 220, is reflected through viewpoint 212a. An angle "α" is the angle at which ray 220' enters camera 212 through viewpoint 212a. An elevation angle "β" is the angle which ray 220 makes with a y-axis 230, e.g., horizontal axis, of mirror 208 as ray 220 contacts intercept point 224. Finally, an angle "γ" is the angle of intercept point 224 on the surface of mirror 208, as measured from x-axis 232, e.g., vertical axis or camera optic axis.

Figure 3:
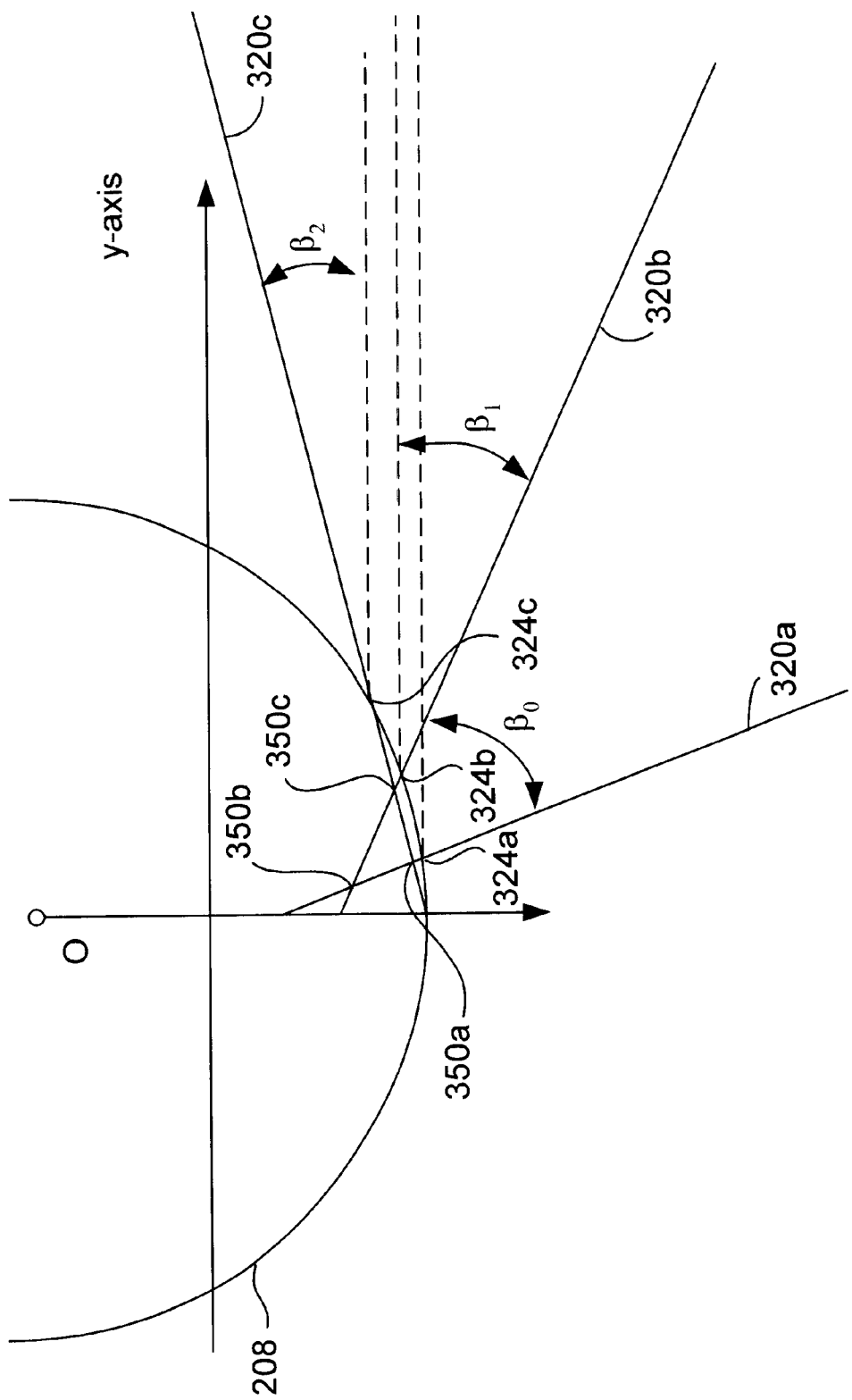
FIG. 3 is a diagrammatic cross-sectional representation of a spherical mirror, i.e., spherical mirror 210 of FIG. 2, in accordance with an embodiment of the present invention.

Within mirror 208, there is no single "virtual" viewpoint at which the optical rays from a scene converge. That is, the rays from a scene do not converge at a single point inside mirror 208. Hence, images gathered by camera 212 are generally distorted, as will be appreciated by those skilled in the art. With reference to FIG. 3, the multiple viewpoints associated with panospheric imaging system 202 of FIG. 2 will be discussed in accordance with an embodiment of the present invention. Optical rays 320 each intersect mirror 208 at their respective intercept points 324. In other words, each ray 320 has an associated intercept point 324. By way of example, ray 320a intersects the surface of mirror 208 at intercept point 324a.

Rays 320 each have different elevation angles "β". Hence, rays 320 converge at different viewpoints 350 within mirror 208. The different viewpoints 350 within mirror 208 effectively form a "cloud" of viewpoints. As a result, there is no single virtual viewpoint within mirror 208 when a camera with a perspective lens, e.g., a standard projective camera, is used. The lack of a single virtual viewpoint associated with panospheric imaging system 202 of FIG. 2 prevents the construction of an undistorted, or error free, perspective view.

In order to reduce the amount of distortion in a constructed view, e.g., to reduce the distortion in a reconstructed image, an single-viewpoint approximation may be made for a panospheric device. In the described embodiment, a single viewpoint may be constructed effectively by mapping rays at any given elevation angle to a similar ray that converges at a single viewpoint, as will be discussed below with respect to FIG. 4. Herein and after, for ease of discussion, the method of mapping rays will be referred to as the iso-β method, or the iso-β construction.

Figure 4:
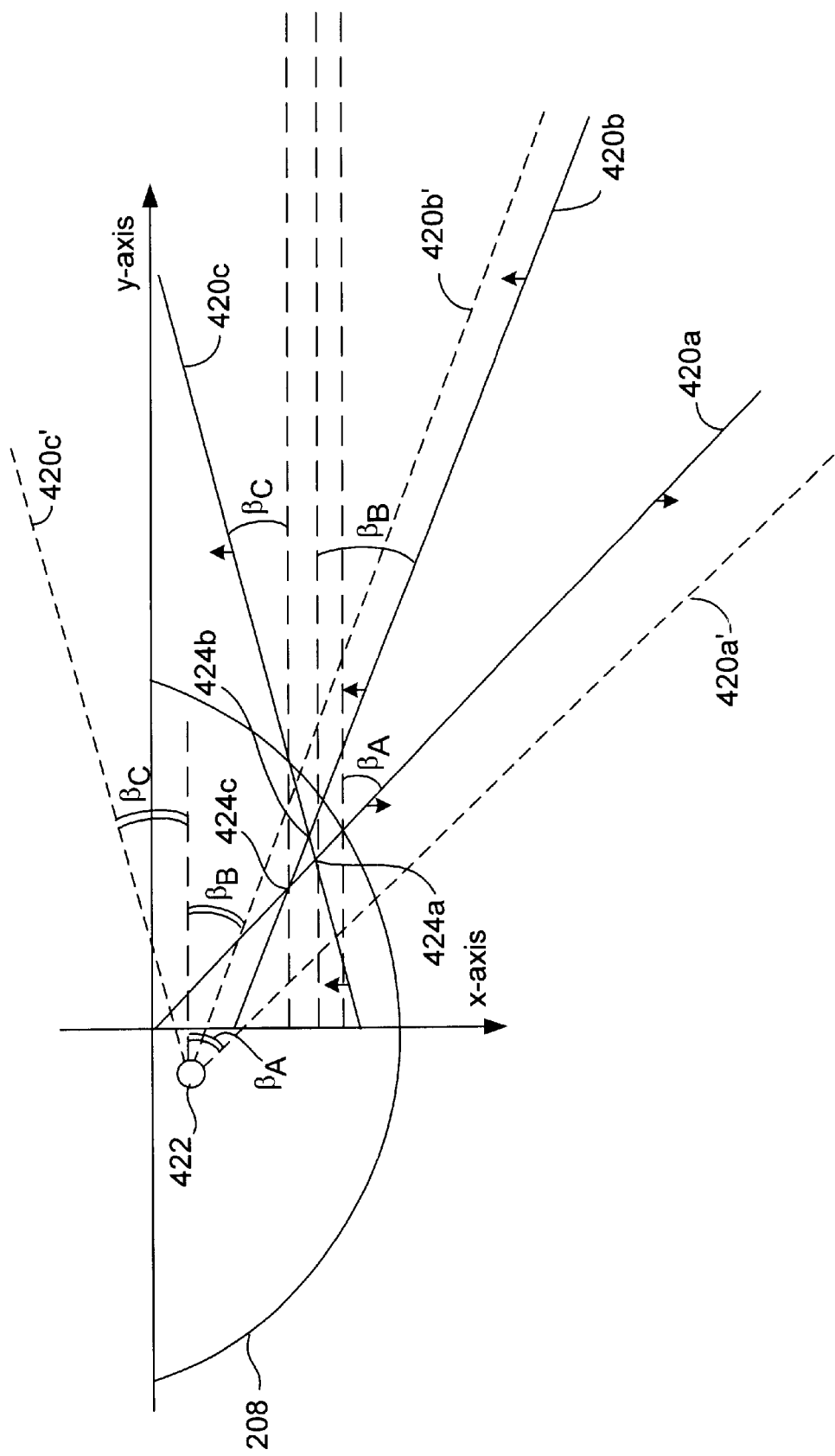
FIG. 4 is a diagrammatic representation of a multiple-viewpoint-to-single-viewpoint mapping in accordance with an embodiment of the present invention.

Referring next to FIG. 4, a multiple-viewpoint-to-single-viewpoint mapping will be described in accordance with an embodiment of the present invention. That is, an embodiment of the iso-β method will be described. The steps associated with one embodiment of the iso-β method will be discussed below with respect to FIG. 6. In the described embodiment, a multiple-viewpoint-to-single-viewpoint mapping involves displacing optical rays. Each optical ray 420, as shown in FIG. 4, is displaced such that at their displaced locations, each displaced optical ray 420' intersects an assumed single viewpoint 422. In general, single viewpoint 422 may be selected to be substantially anywhere. However, in the described embodiment, single viewpoint 422 is selected to be somewhere in proximity to original viewpoints 424. It should be appreciated that in some embodiments, single viewpoint 422 may be chosen to minimize the amount of displacement and, hence, the amount of distortion, necessary to enable all displaced rays 420' to intersect single viewpoint 422.

Each ray 420 which intersects the surface of mirror 208 at a given elevation angle β is displaced by the same amount. By way of example, every ray 420 that intersects the surface of mirror 208 at an angle $β_A$ is displaced by the same amount. Similarly, every ray 420 that intersects the surface of mirror 208 at an angle $β_B$ is displaced by the same amount, which is a different amount from the amount which every ray 420 that intersects the surface of mirror 208 at angle $β_A$ is displaced. Each ray 420 that is displaced maintains the same elevation angle before and after displacement. For example, ray 420a and displaced ray 420a' each maintain the same elevation angle $β_A$.

Figure 5:
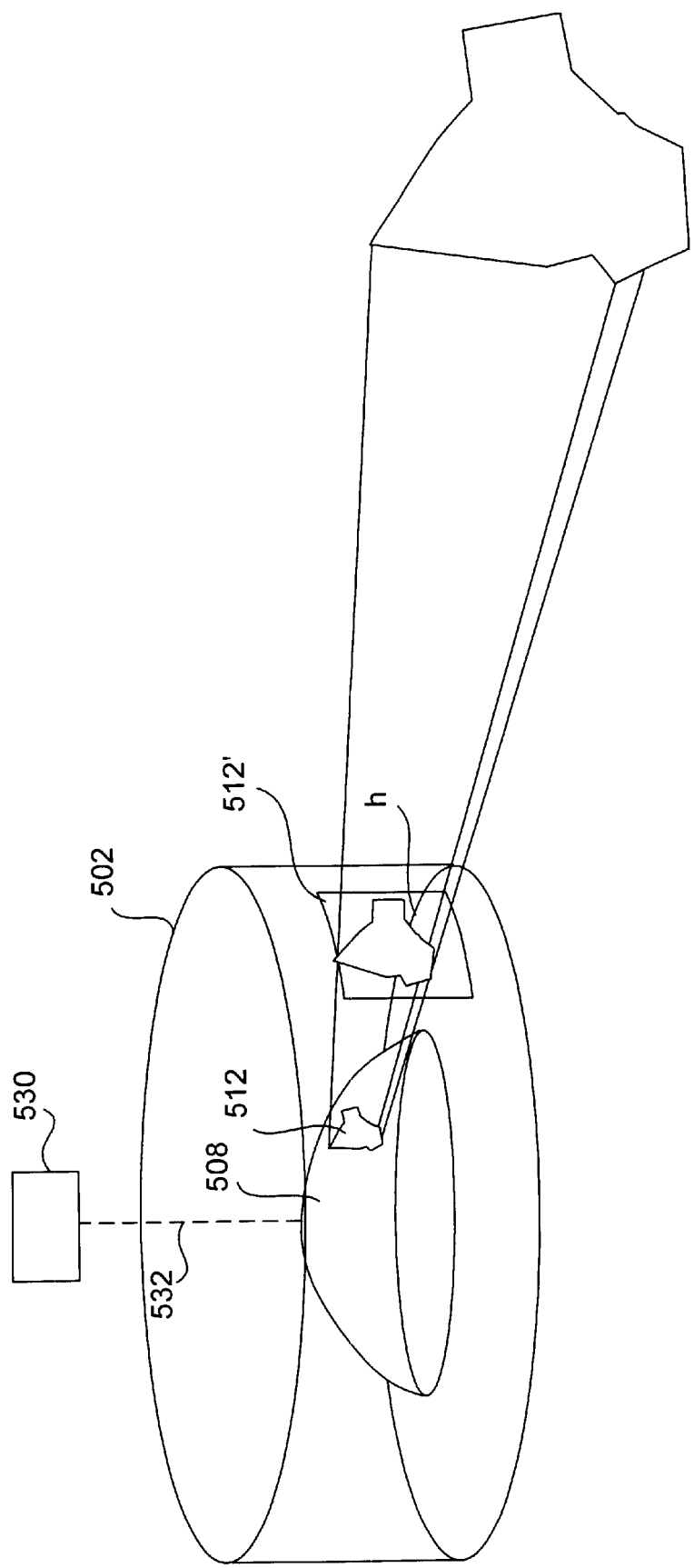
FIG. 5 is a diagrammatic representation of a cylindrical projection of a panospheric imaging device in accordance with an embodiment of the present invention.

Once single viewpoint 422 is selected, and rays 420 are displaced to form displaced rays 420', an image, or projection, that is suitable for projecting may be calculated. The projection surface onto which an image may be projected may vary widely depending upon the particular application for which a panospheric imaging systems is intended. The surfaces may be curved, e.g., cylindrical or spherical, or flat, e.g., planar. FIG. 5 shows an example of a cylindrical projection surface in accordance with an embodiment of the present invention. While a cylindrical projection surface 502 may be suitable for a variety of different processes, cylindrical projection surface 502 is particularly suitable when a spherical mirror 508 is used as a part of a panospheric device in a virtual reality application. As shown image 512 on mirror 508 is projected onto cylindrical projection surface 502, which is parallel to an optical axis 532 of a camera 530, as a cylindrical projection 512'.

A projection created using the iso-β method for cylindrical projection surface 502. The relationship between the position of a point "h" on cylindrical projection surface 502 and its corresponding point "u" on the image plane (not shown) of camera 530 is given by the following relationship:

$$h = h_0 \cot\left(2\arccos\left(\frac{d}{\rho}\frac{u}{\sqrt{f^2+u^2}}\right) - \arctan\left(\frac{u}{f}\right)\right)$$

where $h_0$ is a scale factor that determines the size of cylindrical projection 512', d is the distance between the single viewpoint of camera 530 and the center of mirror 508, ρ is the radius of mirror 508, and f is the focal length of camera 530. In some cases, as for example the case of a planar projection surface, the relationship between the position of a point on the projection plane and its corresponding point on a camera image plane may be found using interpolation.

Figure 6:
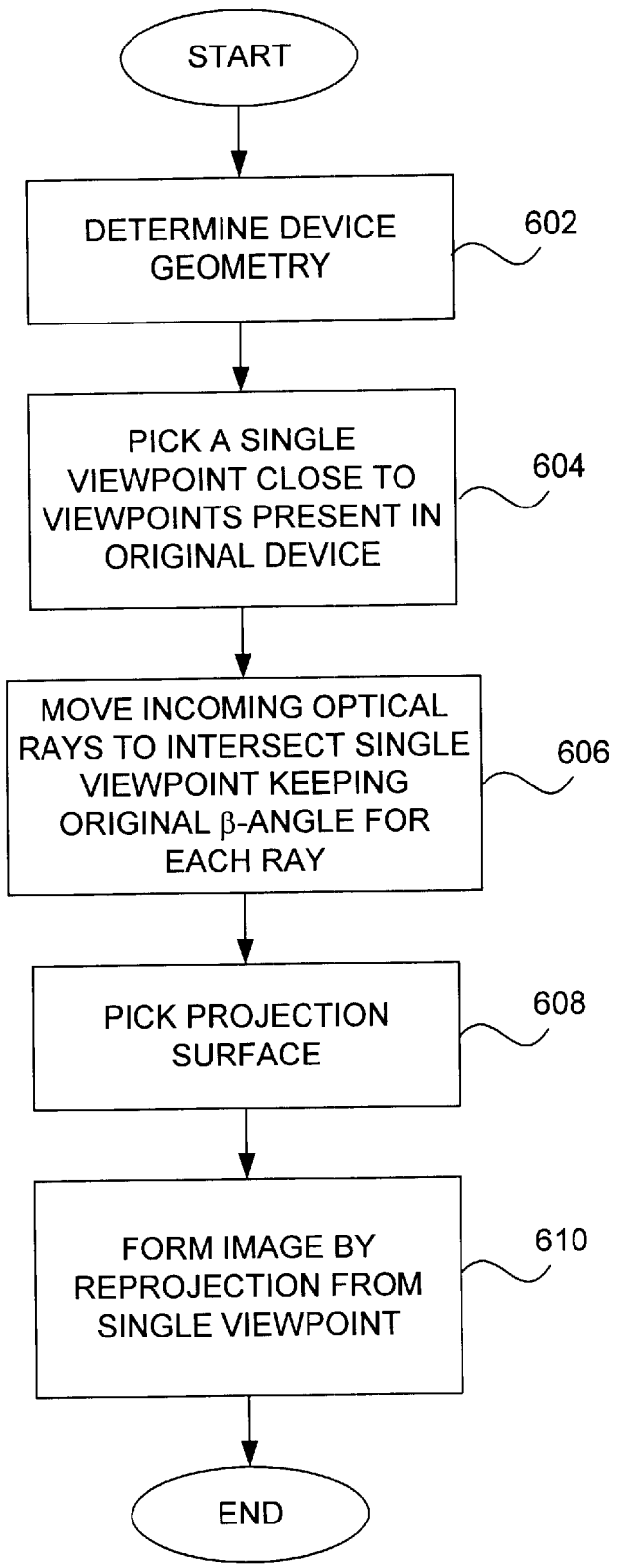
FIG. 6 is a process flow diagram which illustrates the steps associated with a method of creating an image using a multiple-viewpoint-to-single-viewpoint mapping in accordance with an embodiment of the present invention.

FIG. 6 is a process flow diagram which illustrates the steps associated with a method of creating an image using a multiple-viewpoint-to-single-viewpoint mapping in accordance with an embodiment of the present invention. That is, FIG. 6 is a process flow diagram which outlines an embodiment of the iso-β method for generating a relatively sharp image, which is comparable to one generated using a single-viewpoint imaging device, using a device such as a panospheric imaging device. The method begins at step 602, in which the geometry of the imaging device is determined. When the device is a panospheric imaging device which includes a spherically curved, mirrored surface, determining the geometry may include, but is not limited to, identifying the "cloud" of viewpoints, as discussed above with respect to FIG. 4. Alternatively, when the device is a multiple-camera device, determining the geometry may include locating the viewpoint of each associated camera, and identifying the distance between adjacent cameras.

Once the device geometry is determined in step 602, then an assumed single viewpoint that is close to the viewpoints present in the device is identified in step 604. For a panospheric imaging device, the single viewpoint is usually picked to be within or near the "cloud" of viewpoints. After the single viewpoint is picked, process flow moves to step 606 in which incoming optical rays, e.g., optical rays which are incoming with respect to a mirrored surface, are mathematically moved or displaced. Specifically, the optical rays are displaced such that they intersect at a single viewpoint while maintaining the original β-angle associated with each optical ray. Such a displacement was previously described with reference to FIG. 4.

In the described embodiment, a projection surface is picked in step 608 after the optical rays are displaced. Picking a projection surface generally involves determining a suitable surface onto which a reconstructed image is to be projected. The suitable surface onto which an image is to be projected may vary depending upon the requirements of a particular system. By way of example, for a virtual reality application, a cylindrically shaped projection surface, such as the one described above with respect to FIG. 5, may be more suitable than a planar surface, which may be suitable for a surveillance application.

After a suitable projection surface is selected in step 608, an image is formed, e.g., reconstructed, by effectively reprojecting an image from the single viewpoint onto the projection surface. The projection on a projection surface from the single viewpoint, e.g., viewpoint 422 of FIG. 4, may be calculated by identifying a point on the projection surface. The elevation angle and the aximuthal angle of the optical ray that intercepts the identified point and the single viewpoint may be readily determined. The intensity value associated with the identified point may be calculated by locating the point on a image or camera plane that is intercepted by the optical ray reflected from the spherical mirror with the determined elevation angle and aximuthal angle. It should be appreciated that after calculations associated with the projection from the single viewpoint are made, substantially any suitable method may be used to actually project the image onto the projection surface. Such methods are well known to those skilled in the art. Once the image is formed, the process of creating an image is completed.

The iso-β method for mapping generally provides for a good approximation of a perspective projection. However, the mapping may incur a relatively small differential error in the projected height of an object that is being effectively imaged. The calculation of the differential, or distortion, error may be performed using a variety of different methods, as will be understood by those skilled in the art. In one embodiment, absolute offset error "ϵ" associated with a projected image may be calculated as a function of elevation angle. Specifically, for every elevation angle, a corresponding absolute offset error "ϵ" may be identified. The absolute offset error "ϵ" is essentially the distance, e.g., the distance along the camera optic axis, between the actual intercept of a ray with a given elevation angle and the corresponding image projection from the center of a spherical mirror. In one embodiment, the absolute offset error "ϵ" may be determined using the following expression:

$$\varepsilon = \rho \frac{\cos(\gamma + \beta)}{\cos \beta}$$

where, as previously described, ρ is the radius of a spherical mirror, γ is the angle associated with an intercept point as measured from the camera optic axis, and β is the elevation angle.

The differential error, or distortion, associated with an image may be expressed as the difference in the offset between the top of an image and the bottom of the image. This differential error is used to determine the size of an object in a true projective image. That is, given the differential error and the size of an object as it appears in an image, the size of a true projective image may be determined. It has been observed that in many applications in which objects are viewed at elevation angles of approximately zero degrees and above, the distortion is relatively low, e.g., less than approximately five percent.

Although only a few embodiments of the present invention have been described, it should be understood that the present invention may be embodied in many other specific forms without departing from the spirit or scope of the present invention. By way of example, the iso-β method may be applied to folded-path devices, or devices in which the optical path between a camera and a panoramic mirror is folded. Folding the optical path may include incorporating a reflective surface, e.g., a reflective planar mirror, into an imaging system such that optical rays bounce from the panoramic mirror onto the reflective surface, and from the reflective surface to the camera. Such a folded optical path diminishes the amount of space required for a panospheric imaging device by decreasing the distance between the camera and the panoramic mirror, as the camera may be placed near the panoramic mirror.

Similarly, in one embodiment, the iso-β method may be applied with respect to an imaging system in which the camera is placed inside, e.g., within, a panoramic mirror. In such an embodiment, the panoramic mirror may be a hollow hemisphere of glass, coated on the outside with a reflective material. An opening of sufficient size to accommodate a lens barrel of a camera may be made in the top of the mirror. The camera may be placed inside the mirror to effectively image the panoramic mirror with a reflecting mirror that is placed above the lens barrel of the camera.

In general, the steps associated with the iso-β method may vary without departing from the spirit or the scope of the present invention. Specifically, steps may be removed, added, altered, and reordered. By way of example, a projection surface may be picked before a single viewpoint is picked. Alternatively, in one embodiment, a calculation of differential error or absolute offset error may be made as a part of the iso-β method.

The present invention has generally been described as being suitable for use in a panospheric imaging system. As will be appreciated by those skilled in the art, a panospheric imaging system which includes a spherical mirror is one example of a multiple-viewpoint panoramic imaging system. The iso-β method may be used in conjunction with substantially any multiple-viewpoint panoramic imaging system. Another example of a multiple-viewpoint panoramic imaging system is a multiple camera system, e.g., a panoramic imaging system with more than one camera. When each camera in a multiple camera system is approximated as a pinhole camera, or a camera with a single viewpoint, the number of viewpoints in the system is substantially equal to the number of cameras in the system. In order to create a reconstructed image which may effectively be reprojected from a single viewpoint using data obtained using the multiple-camera system, the iso-β method described above, or a variation of the iso-β method, may be applied without departing from the spirit or the scope of the present invention.

A panoramic imaging system which uses the iso-β method may include a computing device which performs the steps associated with the method. The computing device may be configured as an integrated circuit that is in communication with a camera or a spherical mirror. The integrated circuit may be a part of a digital signal processor chip. Alternatively, the computing device may be a computer system with a processor and memory which is in communication with either the camera or the spherical mirror.

It should be understood that the relationship between the position of a point on a projection surface and its corresponding point on a camera image plane may vary. For instance, while one expression for calculating the position of a point on a cylindrical projection plane has been discussed above with respect to FIG. 5, it should be appreciated that other expressions may be used instead. In addition, rather than using an expression, the position may also be determined numerically, e.g., by interpolation. Therefore, the present examples are to be considered as illustrative and not restrictive, and the invention is not to be limited to the details given herein, but may be modified within the scope of the appended claims.

What is claimed is:

1. An apparatus for imaging a wide field of view, the apparatus comprising:
   a camera that includes an image plane;
   a mirrored surface that reflects optical rays towards the image plane, the mirrored surface and the camera being arranged such that optical rays striking the image plane which intersect the mirrored surface at different angles do not share a single viewpoint; and
   a processing system, the processing system being arranged for calculating a desired displacement of at least some of the optical rays such that the optical rays intersect a single viewpoint while substantially maintaining the different angles, whereby the processing system forms an image using the displaced optical rays that appears to be seen from a single viewpoint.

2. An apparatus according to claim 1, wherein the camera comprises a perspective lens and the mirrored surface is a spherically-shaped mirrored surface.

3. An apparatus according to claim 2 wherein the camera is positioned over the mirrored surface such that an optic axis of the camera intersects a center axis of the mirrored surface.

4. An apparatus according to claim 1 wherein the processing system is further arranged to identify the single viewpoint.

5. An apparatus according to claim 1, further including a projection surface on to which the formed image may be projected, wherein the camera further comprises a projection device and wherein the processing system calculates a projection of the image onto the projection surface.

6. An apparatus according to claim 5 wherein the projection surface is a cylindrically shaped surface.

7. An apparatus according to claim 5 wherein the projection surface is a planar surface.

8. A computer program product arranged to enable an image to be projected using a panoramic imaging device, the panoramic imaging device including a first camera, the panoramic imaging device having a plurality of virtual viewpoints and a plurality of optical rays which intersect the plurality of virtual viewpoints, the computer program product comprising:
   computer code for selecting a single viewpoint, the single viewpoint being selected to be in proximity to the plurality of virtual viewpoints;
   computer code for mathematically displacing at least one optical ray selected from the plurality of optical rays, the at least one optical ray intersecting a surface associated with the panoramic imaging device at a first angle, wherein the computer code for mathematically displacing the at least one optical ray includes computer code for moving the optical ray to intersect the single viewpoint while substantially maintaining the first angle;
   computer code for forming an image using the at least one displaced optical ray, wherein the image is formed at least in part by reprojecting from the single viewpoint; and
   a computer-readable medium that stores the computer codes.

9. A computer program product as recited in claim 8 further including computer code for mathematically displacing each optical ray selected from the plurality of optical rays which does not intersect the single viewpoint, each optical ray having an associated angle of intersection with the surface, wherein the computer code for mathematically displacing each optical ray includes computer code for moving each optical ray to intersect the single viewpoint while substantially maintaining the associated angle of intersection.

10. A computer program product as recited in claim 9 wherein the computer code for forming the image includes computer code for using each displaced optical ray to form the image.

11. A method of forming an image using a panoramic imaging device having a camera and a curved mirror with multiple virtual viewpoints, the method including:
   selecting a single viewpoint near the multiple virtual viewpoints;
   applying a mathematical algorithm to computationally displace an optical ray to intersect the single viewpoint, the optical ray intercepting the curved mirror at an elevation angle and passing through a focal point of a camera lens, wherein the elevation angle is substantially maintained when the optical ray is computationally displaced; and
   forming an image by reprojecting the moved optical ray from the single viewpoint.

12. A method for mapping an image according to claim 11 wherein the mathematical algorithm applied to computationally displace the optical ray is at least partially dependent upon a shape of the curved mirror and a spatial relationship between the curved mirror and the camera.

13. A compact panoramic imaging system comprising:
   a substantially spherical mirrored surface; and
   a video camera, the video camera being arranged over the substantially spherical mirrored surface, the video camera further being arranged to capture a real-time panoramic image with a field of view of up to approximately 360 degrees by imaging the substantially spherical mirrored surface, wherein the real-time panoramic image is captured using a single-viewpoint approximation.

14. A compact panoramic imaging system according to claim 13 wherein the substantially spherical mirrored surface comprises a section of a sphere which includes multiple viewpoints at which optical rays which contact the substantially spherical mirrored surface converge, and the single-viewpoint approximation is arranged to mathematically displace the optical rays such that the optical rays converge at a single viewpoint.

15. A compact panoramic imaging system according to claim 13 wherein the video camera includes a perspective lens.

16. A method of forming an image, comprising:
aligning an axis of a mirror with an axis of a camera, wherein the mirror comprises a section of a sphere;
receiving a light ray on an image plane of the camera, wherein the light ray is reflected from a surface of the mirror at an elevation angle;
selecting a viewpoint; and
computationally displacing the light ray such that it passes through the viewpoint without substantially changing the elevation angle.

17. The method of claim 16, wherein the light ray passes through a focal point of the camera.

18. The method of claim 16, wherein the computational displacement is performed by a computing device that is in communication with the camera.

19. The method of claim 16, wherein the computational displacement is the same for all light rays having the same elevation angle.

20. The method of claim 18, wherein the computing device comprises an integrated circuit.

21. A panoramic imaging device, comprising:
a first mirror formed from a section of a sphere;
a camera disposed within the mirror, wherein a lens barrel of the camera is aligned with an opening in the mirror; and
a second substantially planar mirror configured to reflect a light ray from the first mirror to the camera; and
a computing device in communication with the camera for computing a mathematical displacement of the light ray to form an image from a single viewpoint, wherein the computing device calculates the mathematical displacement based upon an angle of reflection of the light ray from the first mirror.

* * * * *